(12) United States Patent
Shaw et al.

(10) Patent No.: US 7,645,841 B2
(45) Date of Patent: Jan. 12, 2010

(54) METHOD AND SYSTEM TO REDUCE POLYMERIZATION REACTOR FOULING

(75) Inventors: Benjamin M. Shaw, Calgary (CA); John D. Hottovy, Bartlesville, OK (US); Dale A. Zellers, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 531 days.

(21) Appl. No.: 10/928,047

(22) Filed: Aug. 27, 2004

(65) Prior Publication Data

US 2006/0045823 A1    Mar. 2, 2006

(51) Int. Cl.
  *C08F 2/00* (2006.01)
  *C08F 4/00* (2006.01)
  *C08F 210/00* (2006.01)
  *C08F 110/02* (2006.01)
  *B01J 8/18* (2006.01)

(52) U.S. Cl. .......................... 526/64; 422/139; 526/68; 526/348; 526/351; 526/352; 526/901

(58) Field of Classification Search ................... 526/64, 526/90, 348, 351, 352; 422/139
See application file for complete search history.

(56) References Cited

U.S. PATENT DOCUMENTS

| 4,774,299 | A  | * | 9/1988 | Dumain et al. | ................. 526/64 |
| 2004/0006186 | A1 | * | 1/2004 | Jensen et al. | ................. 526/133 |
| 2004/0037752 | A1 |  | 2/2004 | Herzog |  |
| 2004/0044148 | A1 | * | 3/2004 | Bidell et al. | ................... 526/64 |

FOREIGN PATENT DOCUMENTS

| EP | 0124333 | 4/1984 |
| EP | 0 432 555 | 6/1991 |
| EP | 1 563 903 | 8/2005 |
| WO | WO 2005/077994 | 8/2005 |

OTHER PUBLICATIONS

Kroezen, A.B.J., Talmon, A.M. and Aanen L., Hydrodynamics in Horizontal Slurry Loop Reactors, 12 pages, Proceedings of Polymer Reaction Engineering V, May 18-23, 2003.

* cited by examiner

*Primary Examiner*—William K Cheung
(74) *Attorney, Agent, or Firm*—Fletcher Yoder (57) ABSTRACT

Techniques are provided for the prevention of reactor fouls in polymerization reactors. A technique is provided for limiting polymer particle size to prevent or limit the occurrence of reactor fouls associated with large polymer particles. A technique is also provided for measuring reactor temperature at one or more local hot spots of the reactor and for controlling the polymerization reaction based upon these temperature measurements. In particular, control of the reaction may be based on the hottest temperature, such that the hottest temperature in the reactor is maintained within the reactor fouling curve. A technique is also discussed for predicting reactor fouls by using statistical analyses, such as periodogram analysis, to identify leading indicators of impending fouls. Preventative measures may be performed upon identification of such a leading indicator. In addition, the statistical analyses may be used to identify catalysts having less propensity to foul.

20 Claims, 9 Drawing Sheets

FIG. 1

Fluff in Size Range, wt%

| Particle Size Range, μ | EP30X CC03-7-224 100μ | 969MPI CC03-7-224 100μ | EP30X CC04-7-268 50μ | HALDS CC04-7-327 40μ | EP30X CC04-7-308 25μ |
|---|---|---|---|---|---|
| 1690-2000 | 0 | 0.11 | 0 | .030 | 0 |
| 1410-1690 | 1.70 | 2.44 | 0 | 0.43 | 0 |
| 1190-1410 | 5.12 | 5.37 | 2.46 | 1.27 | 0 |
| 1000-1190 | 8.70 | 8.71 | 6.38 | 4.01 | 1.48 |
| 841-1000 | 12.31 | 12.00 | 10.23 | 6.97 | 4.22 |
| 707-841 | 15.53 | 14.83 | 14.00 | 10.04 | 7.01 |
| 595-707 | 15.97 | 15.10 | 16.00 | 12.51 | 9.72 |
| 500-595 | 13.83 | 13.15 | 15.11 | 13.19 | 11.84 |
| 420-500 | 10.61 | 10.35 | 12.24 | 11.79 | 12.63 |
| 354-420 | 6.87 | 7.04 | 8.71 | 9.48 | 11.07 |
| 297-354 | 4.14 | 4.53 | 5.84 | 7.43 | 9.54 |
| 250-297 | 2.18 | 2.57 | 3.46 | 5.28 | 7.53 |
| 210-250 | 1.11 | 1.41 | 2.03 | 3.79 | 5.95 |
| 177-210 | 0.49 | 0.68 | 1.10 | 2.65 | 4.49 |
| 149-177 | 0.19 | 0.30 | 0.57 | 1.97 | 3.49 |
| 125-149 | 0.09 | 0.15 | 0.31 | 1.58 | 2.75 |
| 105-125 | 0.09 | 0.12 | 0.23 | 1.33 | 2.15 |
| 88-105 | 0.11 | 0.15 | 0.25 | 1.20 | 1.71 |
| 74-88 | 0.12 | 0.16 | 0.26 | 1.04 | 1.31 |
| 63-74 | 0.11 | 0.13 | 0.22 | 0.80 | 0.93 |
| 53-63 | 0.09 | 0.11 | 0.19 | 0.68 | 0.72 |
| 44-53 | 0.07 | 0.09 | 0.14 | 0.54 | 0.52 |
| 37-44 | 0.04 | 0.05 | 0.09 | 0.35 | 0.31 |
| Total, wt % | 99.47 | 99.55 | 99.82 | 98.63 | 99.37 |

METHOD AND SYSTEM TO REDUCE POLYMERIZATION REACTOR FOULING

BACKGROUND OF THE INVENTION

1. Field of the Invention

The present invention relates generally to the production of polyolefins and, more specifically, to the reduction and/or prevention of fouling in polyolefin reactors.

2. Description of the Related Art

This section is intended to introduce the reader to aspects of art that may be related to aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

As chemical and petrochemical technologies have advanced, the products of these technologies have become increasingly prevalent in society. In particular, as techniques for bonding simple molecular building blocks into longer chains (or polymers) have advanced, the polymer products, typically in the form of various plastics, have been increasingly incorporated into various everyday items. For example, polyolefin polymers, such as polyethylene, polypropylene, and their copolymers, are used for retail and pharmaceutical packaging, food and beverage packaging (such as juice and soda bottles), household containers (such as pails and boxes), household items (such as appliances, furniture, carpeting, and toys), automobile components, pipes, conduits, and various other consumer and industrial products.

One benefit of polyolefin construction, as may be deduced from the list of uses above, is that it is generally non-reactive with goods or products with which it is in contact as well as with the ambient environment. This property allows polyolefin products to be used in many residential, commercial, and industrial contexts, including food and beverage storage and transportation, consumer electronics, agriculture, shipping, and vehicular construction. The wide variety of residential, commercial and industrial uses for polyolefins has translated into a substantial demand for raw polyolefin which can be extruded, injected, blown or otherwise formed into a final consumable product or component.

The raw polyolefin is typically produced in bulk by petrochemical facilities, which have ready access to monomers, such as ethylene, that serve as the molecular building blocks of the polyolefins to be produced. The polymerization reaction itself is exothermic, or heat-generating, and is typically performed in closed systems where temperature and pressure can be regulated to produce polyolefins having the desired properties.

However, in some circumstances a polyolefin reactor may foul, such as when the polymerized product is formed on the reactor walls or when the product cannot be maintained as a slurry. Such a foul may result in a loss in heat transfer, such as due to a reduction in circulation or reduced efficiency at a heat exchanger interface, which may impair or completely negate the capacity to maintain the desired temperature within the reactor. A reactor foul may also result in a reduction in the circulation of the reactor contents and/or in a variation from the desired percent solids (measured by volume or by weight) of the reactor effluent To the extent that a reactor foul may result in deviations from the desired reaction conditions, the polymer product produced during such a reactor foul may not meet the desired specifications; that is, the product may be "off-spec." In extreme or runaway fouling situations, control of the reaction may be lost entirely, and the reactor may become plugged with polymer, requiring one to three weeks to clear, during which time the reactor may not be operated.

A reactor foul may occur due to a variety of different factors, depending on the type of polymerization system and circumstances. Depending on the type of reactor foul, the external indications that such a foul exists may include deviations from the set reaction temperature or increased demand on the coolant system to maintain the set temperature value. Similarly, an increase in the temperature differential between the coolant inlet temperature and reactor temperature may be indicative of certain types of reactor fouls, such as those which interfere with the transfer of heat through the reactor walls. Another external indication of a foul may be an increased motor load as the pump attempts to maintain a velocity within the reactor sufficient to keep the polymer and catalyst particles suspended or attempts to compensate for restriction or obstruction of the flow path. Similarly, a high pressure differential may be observed at the pump and may indicate the presence of some fouls.

For example, copolymer fouling may occur when the reactor temperature falls above the "fouling curve," describing the suitable reactor temperature ranges for producing polyolefins having a desired density. Such a deviation may result in swelling of the polymer particles and an increased tendency for the particles to agglomerate into larger particles, both of which can increase the polymer volume in the reactor. The higher volume percent solids may result in a moving bed of polymer rather than a slurry, which decreases the circulation rate. To compensate, the reactor circulating pump must work harder to propel the fluid and particles, resulting in a high motor load and a high pressure differential, i.e., $\Delta P$.

Similarly, a condition known as a "solids foul" may occur in which circulation of the reactants and product in the reactor is interrupted or degraded. For example, when reactor solids and ethylene concentrations are too high, large polymer particles may be formed which can plug continuous take-off valves or other outlet valves or conduits. The large polymer particles may also settle out of the slurry in the reactor, where they may restrict the flow of slurry. Furthermore, the large polymer particles increase volume percent solids in the reactor, increasing the flow resistance of the slurry and leading to a corresponding high motor load and a high $\Delta P$ as the reactor circulating pump compensates for the increased resistance.

An increase in fine particles of polymer, i.e., "fines," may also result in a form of fouling. In particular, an increased number of fines increases the viscosity of the slurry due to the corresponding increase in particulate surface area. To compensate for the increase in viscosity, the reactor circulating pump must work harder, resulting in a higher motor load and $\Delta P$. In these situations, if the pump is unable to compensate, heat transfer through the reactor walls may be impaired and/or polymer particles may settle out of the slurry.

Another type of fouling that may occur, depending on the reaction environment, is static fouling. Static fouling is typically associated with fines and/or catalysts being held to the reactor wall by static electricity. The catalyst particles and catalyst within the fines facilitate polymerization along the reactor wall, resulting in a film or layer of polymer growing on the reactor wall. As the layer of polymer grows, it decreases the transfer of heat from the reactor to the reactor coolant. The loss of heat transfer resulting from the polymer layer may result in a lowering of the coolant temperature at the inlet to maintain the desired production rate. As a result, the temperature differential, i.e., the spread, between the coolant inlet temperature and reactor temperature may increase. Furthermore, the layer of polymer restricts the flow of slurry along the reactor wall, resulting in an increased motor load and ΔP at the circulating pump.

As might be expected, a reactor foul may be indicated by some or all of the factors mentioned above. For example, a decreasing heat transfer rate, an increasing temperature differential, an increased motor load, and/or an increased ΔP may indicate the presence or development of a reactor foul. In response to these indicators, a rapid response is typically required to regain control of the reaction. Depending on the foul, such responses may include adjusting the reactor temperature, increasing the addition rate of diluent (such as isobutane), decreasing the addition rate of monomer, adding anti-static agents, and/or decreasing the addition rate of catalyst. If control of the reaction cannot be regained, it may be necessary to kill or moderate the reaction to prevent the reactor from becoming plugged with polymer.

In view of the limited response time which may be provided by the available fouling indicators, it may be desirable to prevent fouls from developing. Alternatively, to the extent fouls cannot be eliminated, it may be desirable to provide more warning of an impending foul so that less drastic responses may be employed to address the foul.

BRIEF DESCRIPTION OF THE DRAWINGS

Advantages of the invention may become apparent upon reading the following detailed description and upon reference to the drawings in which.

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present techniques are directed to the detection and reduction and/or prevention of fouls in polyolefin polymerization reactors. In particular, the prevention of reactor fouls by controlling polymer particle size and/or by controlling the polymerization reaction based upon high temperature readings is initially discussed. In addition, the detection of impending reactor fouls using statistical methods, such as periodograms, is discussed. Once detected, such impending reactor fouls may be prevented using relatively minor adjustments. Statistical methods may also be used to evaluate catalysts for a propensity to foul.

Figure 1:
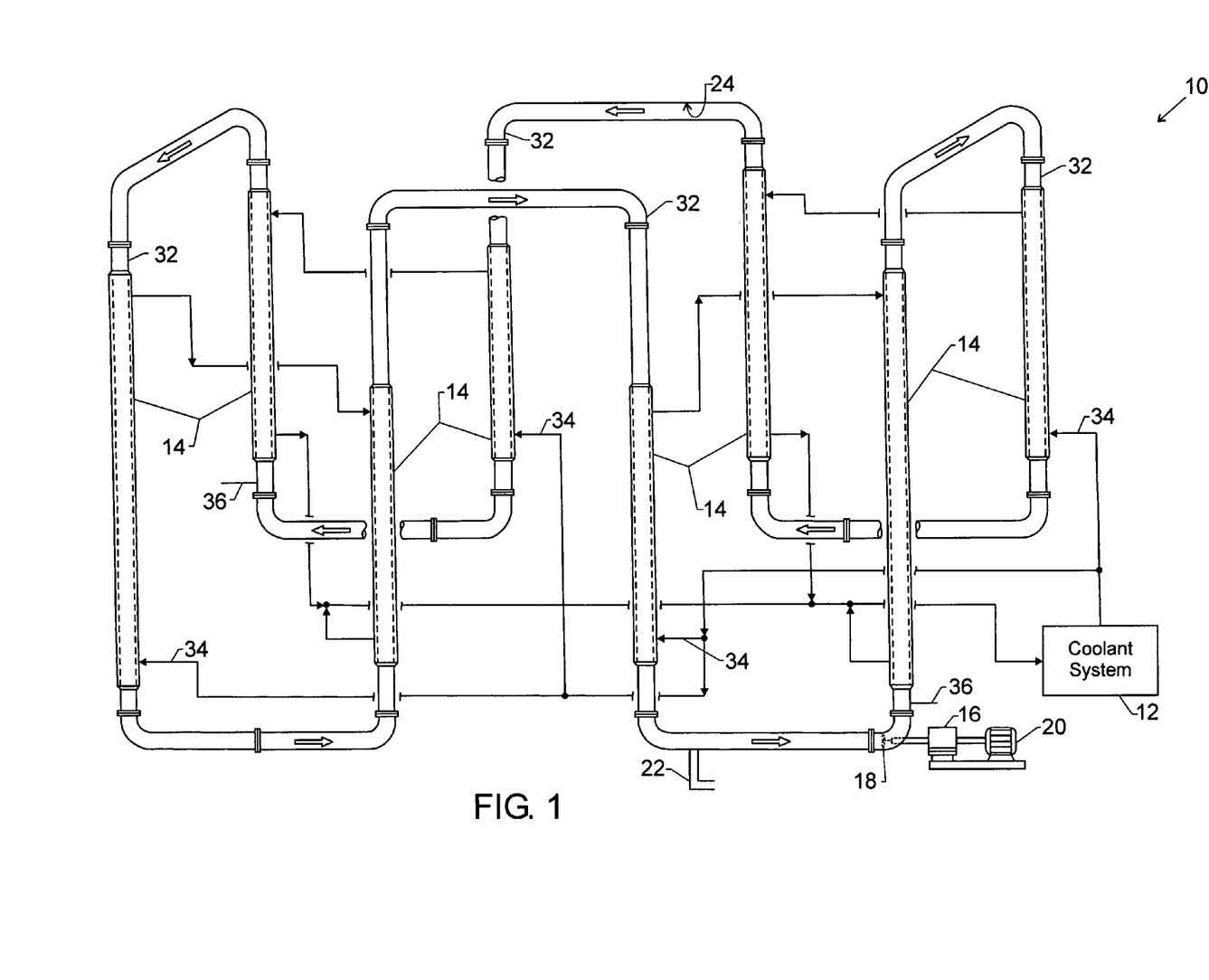
FIG. 1 depicts a loop slurry reactor in accordance with the present technique.

The present techniques may be implemented in conjunction with a variety of polymerization reactions, such as may be carried out in different types of polymerization reactors. An exemplary reactor for carrying out polymerization reactions is a loop slurry reactor 10, as depicted in FIG. 1, which may be used to polymerize polyethylene and other polyolefins. For simplicity, the loop slurry reactor 10 will be discussed herein, though it is to be understood that the present techniques may be applied to other types of polymerization reactors susceptible to fouling, such as boiling liquid pool and gas phase reactors. Indeed, any type of polymerization reaction or reactor may benefit from the present techniques.

With regard to FIG. 1, an exemplary loop slurry reactor 10 and coolant system 12 is depicted. The coolant system 12 removes heat from the loop reactor 10 via reactor jackets 14. The loop reactor 10 is generally composed of segments of pipe connected by smooth bends or elbows. The reactor 10 may be used to carry out polyolefin polymerization under slurry conditions in which insoluble particles of polyolefin, such as polyethylene, are formed in a fluid medium and are suspended as slurry until removed. The fluid medium may include diluent (such as isobutane), ethylene, comonomer (such as hexene), co-catalysts, molecular weight control agents, and any other desired coreactants or additives which are added to the reactor interior prior to or during a polymerization reaction. Likewise, a particulate catalyst may be added to the reactor 10 and suspended in the fluid medium to initiate or maintain the desired polymerization reaction. The catalyst can be any suitable catalyst for polymerizing the monomers that are present. An example of such a catalyst is a chromium oxide containing a hexavalent chromium (or $Cr^{+6}$) on a silica support which may be used to polymerize ethylene momomers.

A motive device, such as pump 16, circulates the fluid slurry in the reactor 10. For example, the pump 16 may be an in-line axial flow pump with the pump impeller 18 disposed within the interior of the reactor 10 to create a turbulent mixing zone within the fluid medium. The impeller may also assist in propelling the fluid medium through the closed loop of the reactor, as depicted by arrows, at sufficient speed to keep solid particulates, such as the catalyst or polyolefin product, suspended within the fluid medium. For example, in a loop slurry reactor producing polyethylene a circulation rate of 30-40 feet/second is typically sufficient to maintain the suspension of polymer product and catalyst as a slurry. The impeller 18 may be driven by a motor 20 or other motive force.

The reaction conditions within the reactor 10 may be selected to facilitate the desired degree of polymerization and the desired reaction speed while keeping the temperature below that at which the polymer product would go into solution. Due to the exothermic nature of the polymerization reaction, the cooling jackets 14 may be provided around portions of the closed loop system. A cooling fluid may be circulated within the cooling jackets 14 as needed to remove the generated heat and to maintain the temperature within the desired range, such as between 150° F. to 250° F. (65° C. to 121° C.) for polyethylene.

As the polymerization reaction proceeds within the reactor 10, the monomer (and comonomer if present) polymerizes to form polymers that are substantially insoluble in the fluid medium at the reaction temperature, thereby forming a slurry of solid particulates within the medium. The solid polyolefin particulates may then be removed from the reactor 10, such as via a settling leg or continuous take-off 22. In downstream processing, the polyolefin discharged from the reactor 10 may be extracted from the slurry and eventually formed into parts or products for personal, commercial, and/or industrial use.

By keeping the temperature, pressure, percent by weight solids, percent by volume solids, and other reaction conditions within the desired ranges and by using a suitable polymerization catalyst, the polyolefin produced by the reactor 10 may have the desired properties. As discussed previously, however, various types of reactor fouls may occur which effectively limit or impair the control of reactor conditions, such as temperature, slurry circulation rate, and/or the percent of solids in the slurry (by weight or by volume). If not prevented or addressed, such reactor fouls may lead to undesirable economic and commercial results, such as off-spec product and/or reactor down-time.

Prevention of Fouls: Polymer Particle Size

For example, a solids foul may result from the presence of large polymer particles in the slurry mixture. In particular, the larger polymer particles require a greater slurry velocity to remain suspended. Failure to maintain sufficient slurry velocity allows the larger polymer particles to settle out of the slurry, leading to a solids foul. Therefore, the tendency of larger particles to be formed limits the solids carrying capacity of the reactor 10, which in turn limits the ultimate production capacity of the reactor 10. Furthermore, as will be appreciated by those of ordinary skill in the art, increasing the solids carrying capacity of the reactor 10 also increases the capability to operate the reactor 10 at higher space-time yield, as measured in pounds of polymer product produced per hour for each gallon of reactor volume or equivalent measures. Such an increase in the space-time yield in conjunction with a reduced incidence of reactor fouls may result in increased polyolefin production and throughput at the reactor 10.

Therefore, to increase the solids carrying capacity of the reactor 10, it may be desirable to produce polymer particles in a desired size range such that the polymer particles are more likely to remain suspended, thereby allowing a greater weight percentage of solids to be achieved in the reactor 10. For example, an Englehard Lynx 100 catalyst, which on average produces smaller polymer particles than those produced using a Davidson 969 MS Chrome catalyst, may be used to achieve a higher solids level in a reactor without inducing a foul. In this example, the polymer particles produced by the Lynx 100 catalyst may be circulated at higher solids levels than comparable polymer particles produced by the 969 MS catalyst.

The desired size range may vary depending on the polymer product and reaction conditions. In one embodiment, to maintain suitable slurry conditions in a loop slurry reactor running under reaction conditions such as those discussed with regard to FIG. 1, less than 1% by weight of the polymer particles are greater than 1,500µ across. In another embodiment, less than 5% by weight of the polymer particles are greater than 1000µ across. In yet another embodiment, for less than 0.1% by weight of the polymer particles are greater than 1,500µ across and/or for less than 0.5% by weight of the polymer particles are greater than 1000µ across At the other extreme, to avoid problems associated with excessive numbers of fine particles, in one embodiment, less than 5% by weight of the polymer particles are less than 100µ across and, in another embodiment, less than 0.5% by weight of the polymer particles are less than 100µ across. Furthermore, in yet another embodiment, more than 70% by weight of the polymer particles are between 300µ and 500µ across and, in an additional embodiment, more than 80% by weight of the polymer particles are between 300µ and 500µ across. In yet another embodiment, more than 90% by weight of the polymer particles are between 300µ and 500µ across.

Figure 2:
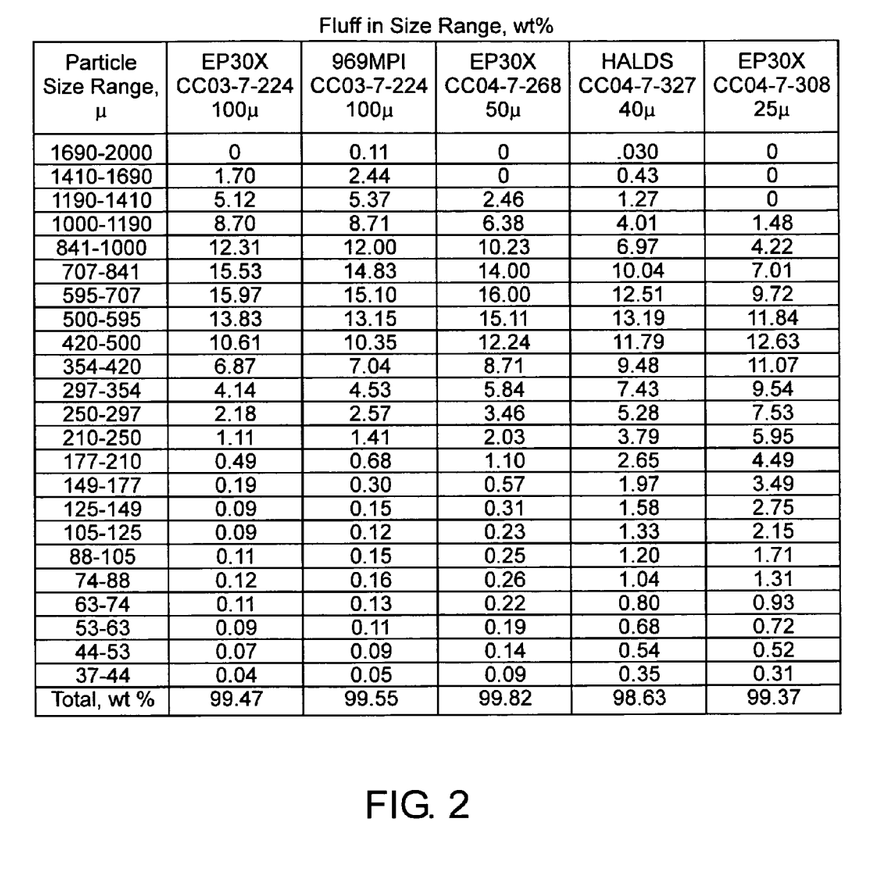
FIG. 2 is a table depicting fluff size ranges as a function of catalyst size.

Production of polymer particles having size distributions in accordance with these preferences may be accomplished by a variety of techniques. For example, a catalyst may be employed which, due to the catalyst size, shape, reactive surface area, or other catalyst activity characteristic, produces polymer particles in the desired size range. In particular, the size of the polymer particles produced by a catalyst generally varies proportionally with the catalyst particle size; that is, smaller catalysts generally produce smaller polymer particles. An example of this is provided in FIG. 2, in which a table comparing polymer particle size for different sized catalysts is provided. As can be seen in the table of FIG. 2, the weight percentage of different sized polymer particles varies between catalysts and generally corresponds to the catalyst particle size. For instance, in the provided example, the 25µ EP30X catalyst does not produce measurable amounts of the polymer particles larger than 1190µ, unlike the larger catalysts. Similarly, the catalysts smaller than 100µ produce less than 5% by weight of polymer particles greater than 1,000µ across while 100µ catalysts produce more than 5% by weight of polymer particles greater than 1,000µ across. While catalyst size may be one factor which determines polymer particle size, other factors, such as morphology, active site accessibility, and so forth, may also contribute to the range of polymer particle sizes produced by a given catalyst.

Alternatively, a roughened reactor wall, typically measured by the root mean square (RMS) roughness, may be employed. In particular, the average polymer particle size, is believed to be related to the reactor friction factor, which is a function of the roughness of the reactor wall 24. For example, a relatively smooth reactor wall 24, such as a reactor wall having an RMS of 63 or less, does not break down or attrite polymer particles in a slurry moving along the reactor wall 24 at 30 to 40 feet per second to the same extent that a reactor wall 24 having an RMS between 63 and 250 does. Similarly, a reactor wall 24 with an RMS of 250 or greater may result in an even greater reduction in average polymer particle size compared to a reactor wall having a lower RMS. As a result, the average polymer particle size may be smaller, under similar slurry movement conditions, in a reactor 10 having rougher reactor walls 24. One possibility, therefore, for reducing average polymer particle size is to use a rough reactor wall, either by machining the reactor wall 24 to increase the RMS or by not smoothing the reactor wall 24.

Similarly, the pump 16 and/or its environment may be modified to facilitate the production of smaller polymer particles. For example, it may generally be preferable for polymer particles to pass near the fast moving impeller tips rather than the slower moving hub to maximize the attrition of the polymer particles caused by the impeller blades. This may be accomplished in a variety of manners, such as by using an impeller 18 having shorter impeller blades and/or a larger impeller hub which make it more likely that suspended particles will pass near the faster moving impeller tips rather than the slower moving portions of the impeller blades near the hub. Furthermore, if an impeller 18 is used which can rotate within the diameter of the main reactor loop, the use of a flared flow transition piece having a greater diameter may be avoided.

Use of such a flared flow transition piece may be undesirable to the extent that denser polymer particles may not disperse to the periphery of the transition piece, where the fast moving impeller tips are located, but may instead continue through the center of the transition piece, where the slower moving portions of the impeller near the hub are located. In particular, such a flared transition piece is generally about 2 feet in length while the reactor contents are typically circulating at approximately 37 feet/second. Due to the shortness of the transition piece relative to the circulation rate, the denser polymer particles may have approximately one-twentieth of a second to disperse toward the periphery of the transition piece before reaching the end of the transition piece.

Figure 3:
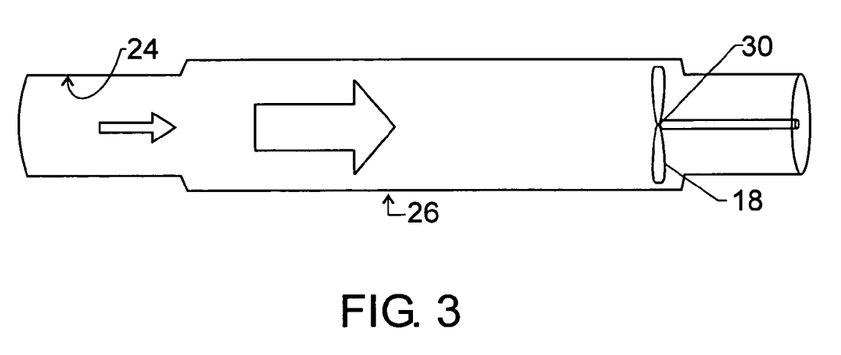
FIG. 3 depicts a cut-away view of a polyolefin reactor segment including a long flow transition portion, in accordance with one aspect of the present technique.

One alternative, depicted in FIG. 3, is to incorporate a long flow transition piece 26 when it is desired to employ an impeller 18 that is larger than the main reactor diameter. For example, the depicted long flow transition piece 26 is ten feet in length. Due to the greater length of the long flow transition piece 26, the denser polymer particles are more likely to disperse to the periphery of the long flow transition piece 26, where they may be attrited by the faster moving impeller tips. While a ten foot long flow transition piece 26 is depicted in FIG. 3, the length may vary, with one embodiment including long flow transition pieces 26 between ten feet and twenty feet in length. In general, however, the long flow transition piece 26 is sized to allow the denser polymer particles to disperse around the impeller 18 as opposed to being carried by inertia through the central portion of the impeller 18.

Figure 4:
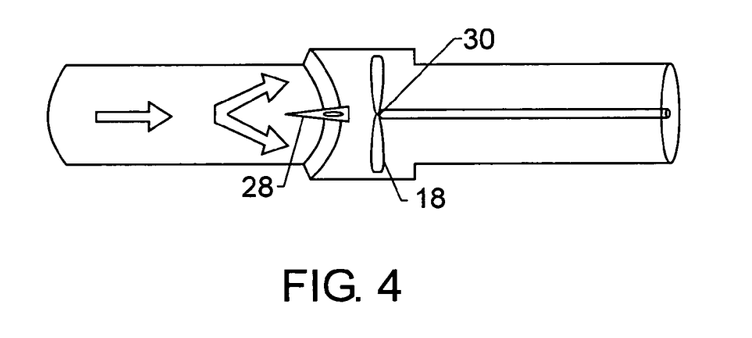
FIG. 4 depicts a cut-away view of a polyolefin reactor segment including a central flow diverter, in accordance with one aspect of the present technique.

Alternatively, a transition piece incorporating a flow diverter 28 sized and positioned to correspond to the impeller hub 30 may be employed for directing polymer particles toward the tips of the impeller blades, as depicted in FIG. 4. As will be appreciated by those of ordinary skill in the art, other techniques may also be employed to divert the flow of slurry to the periphery around the impeller 18, where the faster moving impeller tips may attrite the polymer particles to maintain a smaller average polymer particle size.

Figure 5:
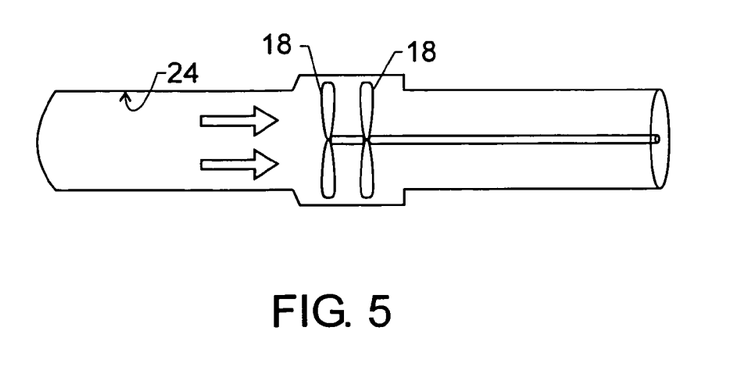
FIG. 5 depicts a cut-away view of a polyolefin reactor segment including multiple impellers, in accordance with one aspect of the present technique.

Similarly, specialized impeller designs, such as designs that have a more severe effect on the polymer particles, may be employed to increase the attrition of polymer particles. Alternatively, the pump 16 may be operated at higher speed to increase attrition of the polymer particles by the impeller 18. In addition, a multi-stage pump or multiple pumps, such as the dual impellers 18 depicted in FIG. 5, may also be employed to increase the overall attrition of the polymer particles provided by the impeller(s) 18.

Prevention of Fouls: Temperature Control

While the preceding discussion may be useful in preventing solid fouls based on large polymer particle sizes, other types of fouls, such as copolymer fouls, may occur where control of the polymerization reaction based on the reaction temperature is lost or impaired. For example, in a copolymer foul, as discussed above, reactor temperatures outside of the fouling curve may lead to increased fluff particle volumes, i.e., the polymer particles may swell. As the copolymer foul continues, the polymer volume in the reactor may continue to increase beyond the circulatory capacity of the reactor, increasing the load on the pump 16 and potentially leading to the inability of the pump 16 to maintain slurry conditions.

One technique that may reduce the likelihood of or prevent such a copolymer foul is to measure reactor temperature at local hot spots 32 in the reactor 10 and to control the reaction based on one of the hot spots 32, such as the hottest point, or on a measure of central tendency of the measured temperatures, such as on the mean, median, or mode of some or all of the measured hot points. Alternatively, an integrated function of the temperature measured at the hot spots 32 may be calculated and updated and control maintained based on the integral.

The local hot spots 32 of the reactor 10 may be determined as a function of the coolant feed locations 34 and monomer feed locations 36. For example, in the depicted eight-leg reactor of FIG. 1, four local hot spots 32 may be present, one for each pair of cooling jackets 14. In particular, if the reactor legs are alternately cooled by cooling jackets 14 receiving fresh, i.e., cold, coolant and used, i.e., warmer, coolant, a local hot spot 32 may be expected between where the slurry exits a reactor leg cooled by used coolant and where it enters the next reactor leg cooled by fresh coolant. In one embodiment, the hot spots 32 are typically at the top of a vertical pair of reactor legs just after the 180 degree bend that is typically not cooled. A local hot spot 32 in the reactor 10 may reach a sufficiently high temperature to cause polymer particles to swell, possibly leading to a copolymer foul, as discussed above.

The likelihood of a copolymer foul may be reduced by controlling the reactor temperature based on one or more of the temperatures measured at the local hot spots 32 or on a value derived from some or all of the temperatures measured at the local hot spots 32, such as a mean, median, or integral. The derived value or measured temperature may be compared to one or more threshold values, such as the set temperature, the upper bound for the fouling curve at a given pressure, or temperatures derived from the fouling curve which may indicate an undesired temperature.

Based on this comparison, the operation of the coolant system 12 may be adjusted to maintain the desired reactor temperature. For example, if the reactor temperature, as measured at the local hot spots 32, is too high, the coolant system 12 may employ cooler coolant or may increase the rate at which coolant is pumped through the cooling jackets 14. These adjustments to the operation of the coolant system 12 may be made manually, such as by an operator adjusting addition of fresh coolant to the system or adjusting one or more valves controlling the flow rate of coolant through the jackets 14. Alternatively, the adjustments to the operation of the coolant system may be made in an automated manner, such as by the automated operation of valves controlling the addition of fresh coolant to the coolant system 12 or controlling the flow rate of coolant through the operation of jackets 14.

In this manner, control of the reactor temperature is based on the highest temperature(s) in the reactor 10, either directly or via a derived value. Such control helps prevent localized elevations in reactor temperature that might lead to polymer particle swelling and to fouls associated with such swelling.

Furthermore, if the temperature is controlled at the hottest spot in the pair of reactor legs, the time for the reactor temperature control system to react is reduced. In particular, for the coolant system 12 to control a reactor temperature disturbance starting at a reactor hot spot, the disturbance must travel with the slurry to the temperature control point and be detected. Then the controller acts to send either colder or more coolant to the reactor 10. The changed coolant then must travel from the coolant exchanger to the reactor 10 and into the reactor jacket 14 and to the hot spot to correct the disturbance. By measuring and controlling the reactor temperature at the reactor hot spots 32, the time needed for the coolant system 12 to respond is reduced and the temperature disturbance can be controlled sooner.

Figure 6:
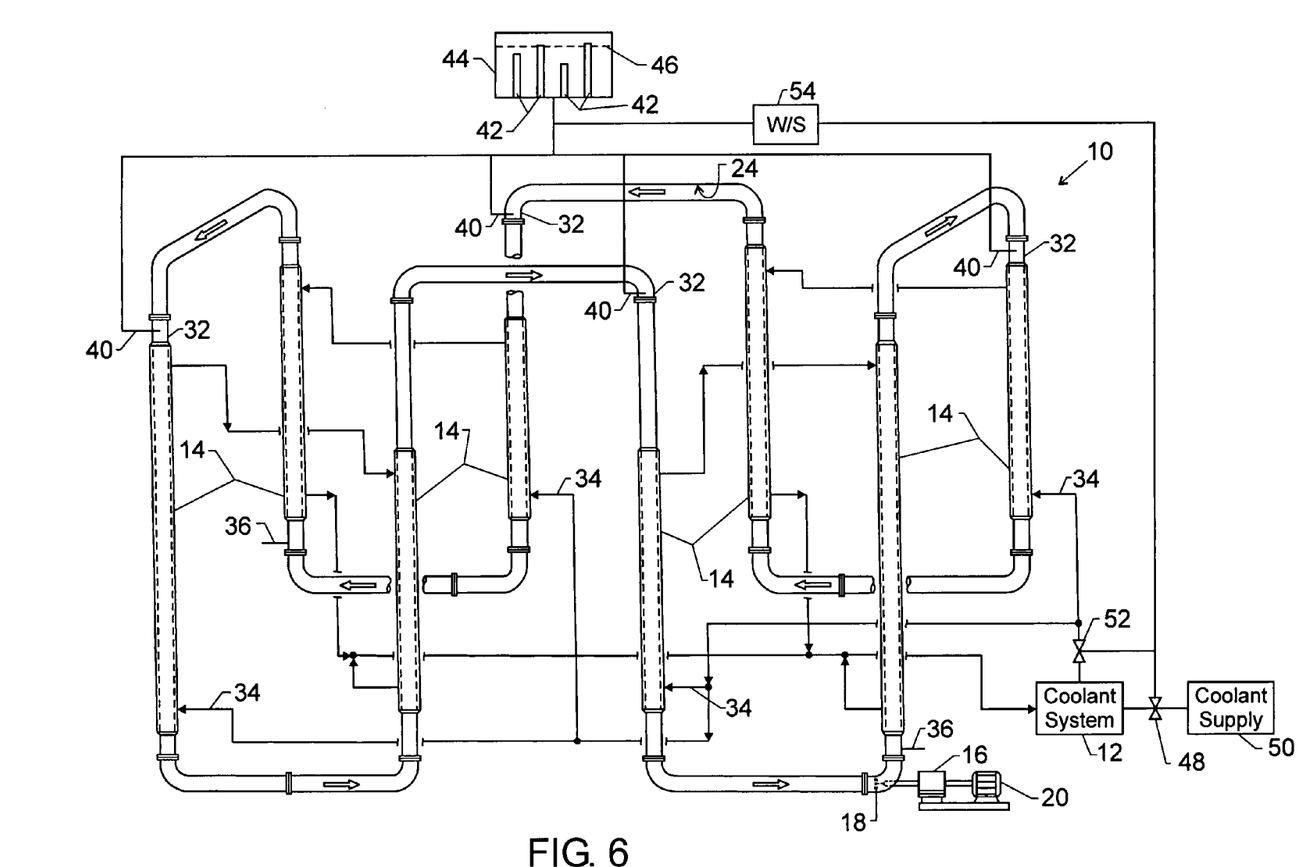
FIG. 6 depicts a loop slurry reactor configured for manual temperature control based on the temperature measurements obtained at local reactor hot spots, in accordance with one aspect of the present technique.

For example, as depicted in FIG. 6, in one implementation, temperature may be monitored at each of the local hot points 32, such as by a thermistor 40 or thermocouple. In the manual implementation depicted in FIG. 6, the temperatures 42 measured by the thermistors 40 may be displayed visually, such as on a monitor 44 or gauge, for an operator to review. A temperature 42 which crosses a temperature control threshold 46 may prompt the operator to adjust one or more reactor conditions, such as the temperature of the coolant entering the cooling jackets 14, the coolant circulation rate, the catalyst addition rate, and/or the monomer addition rate. In this way, the reactor temperature is controlled such that the hottest point in the reactor 10 remains within the fouling curve associated with the desired product, thereby preventing or reducing the incidence of polymer swelling which might lead to a copolymer foul.

For example, in one embodiment, reactor temperature may be decreased by increasing the percentage of fresh coolant within the coolant system 12 or by increasing the flow of coolant through the cooling jackets 14. Such increases may be accomplished by adjusting a coolant supply valve 48 between a coolant supply 50 and the coolant system 12 or by adjusting a coolant flow valve 52 providing coolant flow to one or more of the cooling jackets 14. In one embodiment, the actuation of the coolant supply valve 48 and/or the coolant flow valve 52 is accomplished by electrical signals generated by valve control circuitry or a valve control routine, such as may be present on an operator workstation 54, such as a suitably configured general or special purpose computer. While FIG. 6 depicts the display of measured temperatures 42 in the monitoring and control of reactor temperature, circuitry or routines present on the operator workstation 54 may process the measured temperature data such that only the highest measured temperature is displayed, an average measured temperature is displayed, a median measured temperature is displayed, or some other selected or derived value, such as an integral, is displayed for an operator to monitor.

Figure 7:
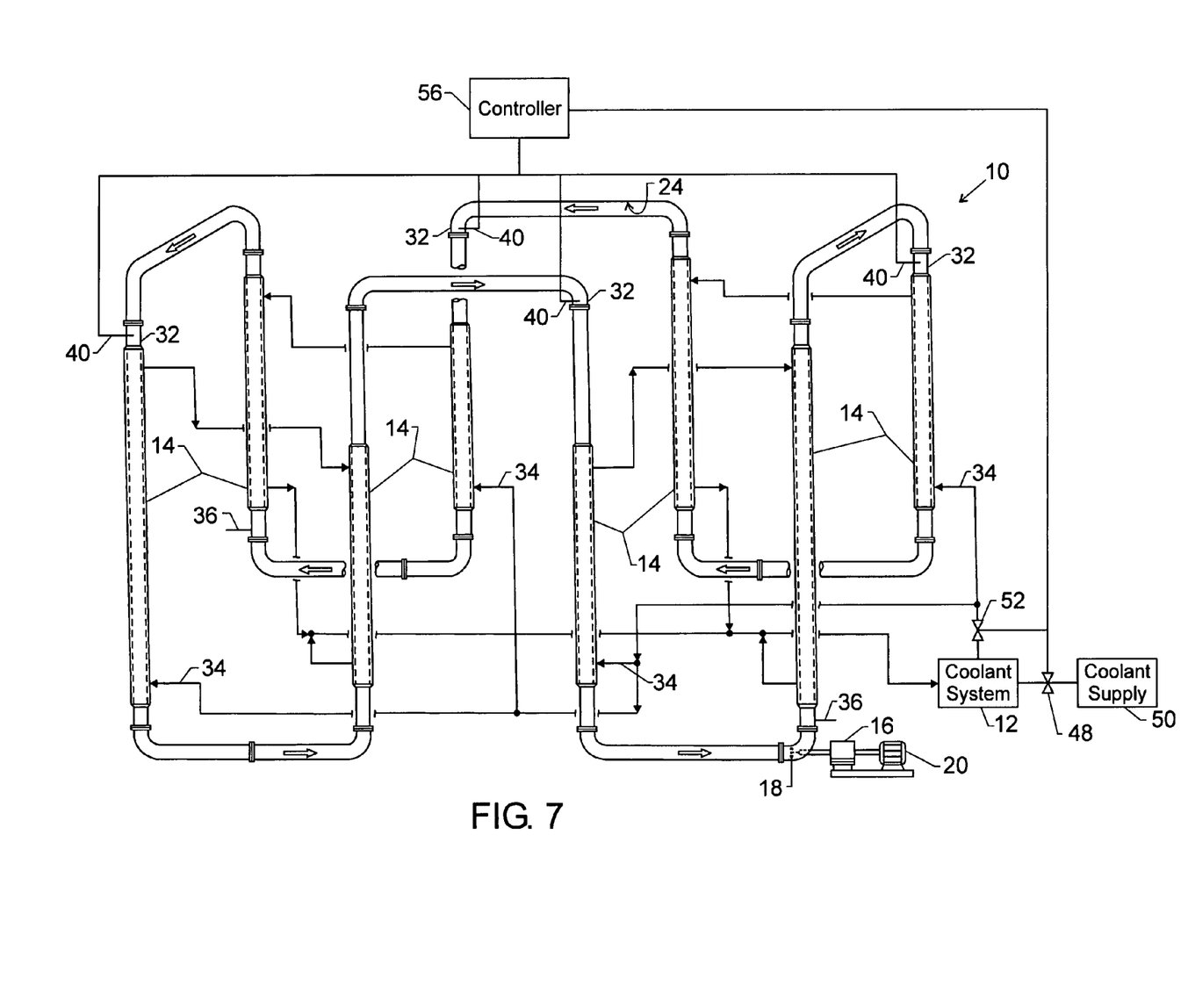
FIG. 7 depicts a loop slurry reactor configured for automatic temperature control based on the temperature measurements obtained at local reactor hot spots, in accordance with one aspect of the present technique.

Alternatively, the temperature control scheme may be fully or partly automated. As depicted in FIG. 7, the temperatures measured by the thermistors 40 located at the local hot spots 32 is provided to a controller 56, such as a suitably configured general or special purpose computer system. The controller 56 may be provided with control circuitry or may execute one or more control routines to determine if a measured temperature or a value derived from the measured temperatures, such as the average or median temperature, crosses a temperature control threshold. If a threshold is crossed by a measured temperature or a derived value, the controller 56, via valve control circuitry or routines, generates signals that adjust the flow of one or both of the coolant supply valve 48 and the coolant flow valve 52, as described above.

Prevention of Fouls: Early Detection

The preceding discussion focuses primarily on preventing or reducing fouling situations by either limiting polymer particle size or by controlling a polymerization reaction based on extreme reactor temperature. It may also be desirable to predict impending fouls sufficiently in advance that preventative action may be taken which is less severe than the action required to recover from an ongoing foul. For example, predictive techniques may utilize one or more reactor or reaction characteristics to predict a reactor foul prior to onset so that preventative steps may be taken.

One such technique utilizes statistical analyses of reactor operational data to predict reactor fouls. For example, reactor operation data, such as temperature, pressure, the addition rate of reactants and/or catalysts, and the power consumption of the pump are examples of reactor operating conditions that may be monitored and measured over time, either constantly or at intervals. Such data sets represent a time series for the reactor condition being measured, that is the data set includes data points representing the measured condition at known or fixed times. Time series of data may be analyzed to detect trends or patterns in the data which allow predictions to be made about future conditions, such as future reactor operating conditions.

For example, the periodogram technique for analyzing time series data of this type may be used to evaluate the randomness of the set of time series data to determine if there are actually non-random, i.e., periodic, components within the data. This periodogram technique assumes that the time series data set in question is actually composed of sine and cosine waves of different frequencies. Based on this assumption, the periodogram technique may be used to detect and estimate the amplitude of a sine component buried in the noise of the data or to identify periodic components of unknown frequency within a time series of data. Furthermore, periodogram analysis may be used to estimate the amplitude, i.e., the "peak," of a sine component of known frequency, such as identified periodic components. In this way, periodic components may be identified in the noise of the time series data, such as reactor pump power, and the respective frequency and amplitude of the identified periodic components may be determined and plotted. Trends in the periodic components may then be used to in evaluating the reactor operating conditions for current or future events of interest, such as reactor fouls.

For example, a periodogram analysis of reactor operation data, such as pump power, may be conducted using the equations set forth below or their computational equivalents. For odd numbers of time measurements, the number of measurements N equals 2q+1 and the Fourier series model:

$$z_t = \alpha_0 + \sum_{i=1}^{q} (\alpha_i c_{it} + \beta_i s_{it}) + e_t \quad (1)$$

may be fitted where $c_{it}=\cos(2\pi f_i t)$, $s_{it}=\sin(2\pi f_i t)$, and where $f_i=i/N$ is the ith harmonic of the fundamental frequency 1/N such that the least squares estimates of the coefficients $\alpha_0$ and $(\alpha_i,\beta_i)$ will be:

$$\left.\begin{array}{l} a_0 = \bar{z} \\ a_i = \frac{2}{N}\sum_{t=1}^{N} z_t c_{it} \\ b_i = \frac{2}{N}\sum_{t=1}^{N} z_t s_{it} \end{array}\right\} i = 1, 2, \ldots, q. \quad (2)$$

The respective periodogram then includes the $q=(N-1)/2$ values:

$$I(f_i) = \frac{N}{2}(a_i^2 + b_i^2) \quad i = 1, 2, \ldots, q \quad (3)$$

where $I(f_i)$ is the intensity, i.e., amplitude, at frequency $f_i$. When N is even, the number of observations N equals 2q and equations (1), (2), and (3) apply as described above for i=1, 2, ..., (q−1). However, for i=q:

$$a_q = \frac{1}{N}\sum_{t=1}^{N}(-1)^t z_t \quad (4)$$

$$b_q = 0$$

and $$I(f_q) = I(0.5) = N a_q^2. \quad (5)$$

As will be appreciated by one of ordinary skill in art, the highest frequency is 0.5 cycles per time interval since the smallest period is two intervals.

Therefore, as described mathematically in equations (1)-(5) above, if a set of time series data is random, containing no systematic sinusoidal component, each component $I(f_i)$ would have the same expected value, with actual values distributed in a chi-square distribution with two degrees of freedom. However, if the set of time series data contains a systematic sine component with a frequency of $f_i$, the value of $I(f_i)$ would be inflated at or near $f_i$. Statistical deviations from a chi-square distribution may, therefore, be used to discover the presence of periodic components in the time series data and to estimate their frequency and amplitude. As will be appreciated by one of ordinary skill in the art, the mathematical and statistical operations described above may be performed by a statistical analysis computer program, such as StatGraphics, or by a more general application, such as a spreadsheet program, configured to execute suitable algorithms. Such computerized implementations may be performed on a general or special-purpose computer system configured to analyze time series data.

One type of time series data which may be analyzed in this manner is reactor operations data. In particular, reactor circulating pump power may be of interest since increases in pump power are often an indicator of a reactor foul. Trends in the periodic components of pump power may, therefore, be useful in predicting reactor conditions such as fouls. In particular, pump power in kilowatts is typically monitored during normal operation, providing an existing set of time series data for analysis. In addition, pump power can be measured at set intervals, such as at five second intervals, and is an independent measure that is relatively free of problems such as data scatter. Other reactor data, such as reactor density and/or pressure, may also useful in predicting reactor fouls.

Figure 8:
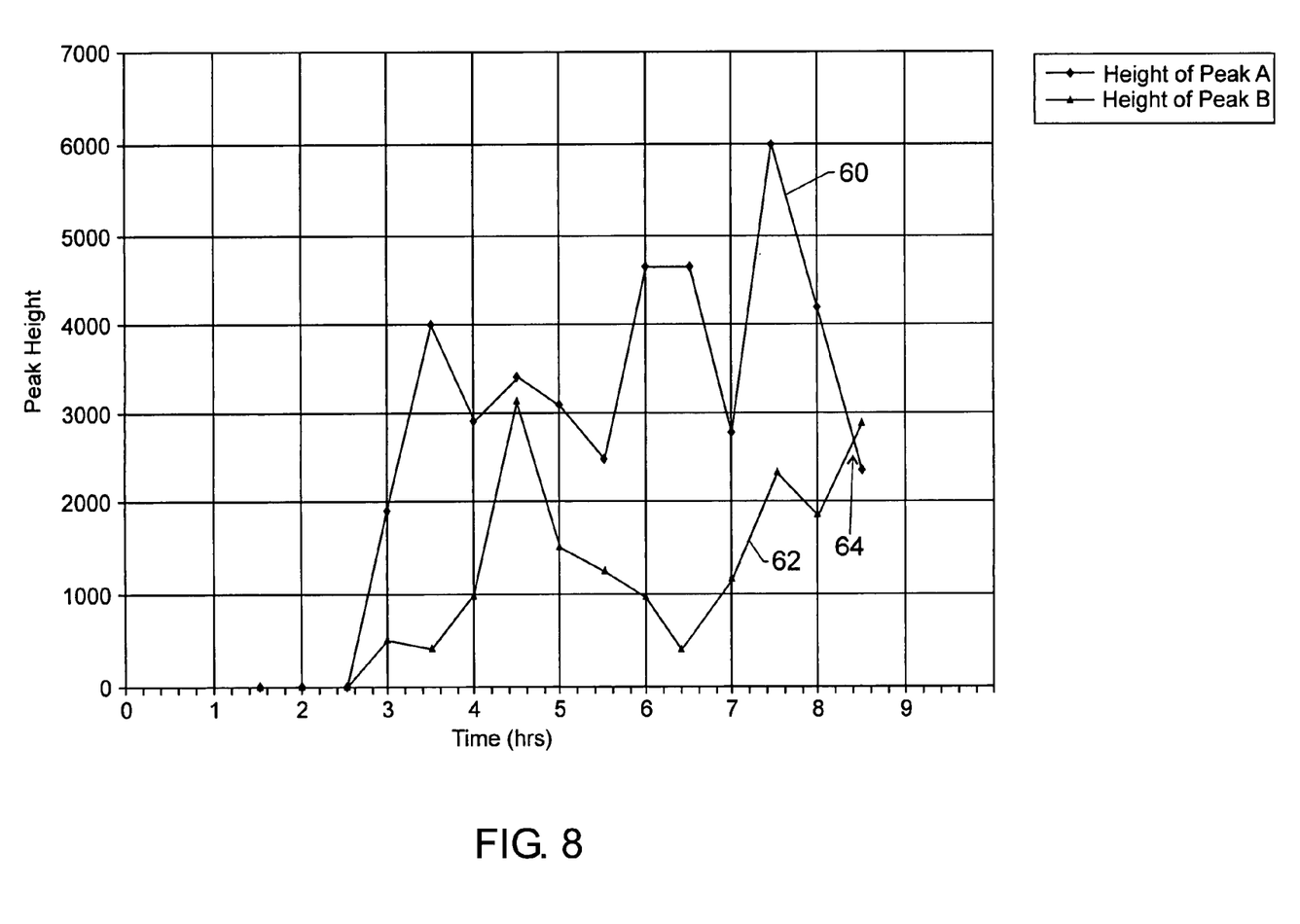
FIG. 8 is a chart depicting a periodogram with dual traces in accordance with the present technique.

Though various other reactor measurements may be employed, for the purpose of illustration an example based on pump kilowatt measurements will be discussed herein. For example, referring now to FIG. 8, a chart depicting the results of a periodogram analysis of pump power measurements is provided. As depicted in FIG. 8, a periodogram analysis of pump power measurement identified two different periodic components of the pump power data prior to the occurrence of a foul. The first periodic component was determined, as described above, to have a period of approximately 22.5 seconds while the second periodic component was determined to have a period of 45.4 seconds. Based on these frequencies, the intensities of the periodic components during half-hour time intervals were determined and plotted over time to form the chart of FIG. 8, where the first and second periodic components are represented respectively by the first trace 60 and second trace 62. While it is uncertain what the first and second periodic components represent, one possibility is that they represent pump power oscillations caused by the hydrodynamics of the reactor, a phenomena occasionally referred to as density waves.

As noted above, the presence of the second trace 62 was observed prior to the occurrence of a foul. In particular, it was noted that a crossover 64 of the first trace 60 and the second trace 62 preceded a reactor foul, with a foul typically occurring within hours of such a crossover 64. Indeed, in reviewing recorded pump power data, it was possible to predict a foul at least three hours in advance and up to 18 hours in advance. Because of the advance warning provided by a crossover 64, action may be taken to avert a foul or minimize its severity, such as lowering reactor solids and/or adding anti-static agents. For example, lowering reactor solids by 0.5% to 1.0% after a crossover event 64 is observed may prevent a foul or reduce its severity. While crossover events 64 observed in the analysis of pump power data represent one possible predictive indicator of a foul, other predictive indicators, such as divergences, inflection points, maximums, minimums, and so forth, may be observed prior to other reactor events or in conjunction with the analysis of other types of reactor operating data, such as temperature, pressure, reactant and catalyst addition rates, and so forth.

Figure 9:
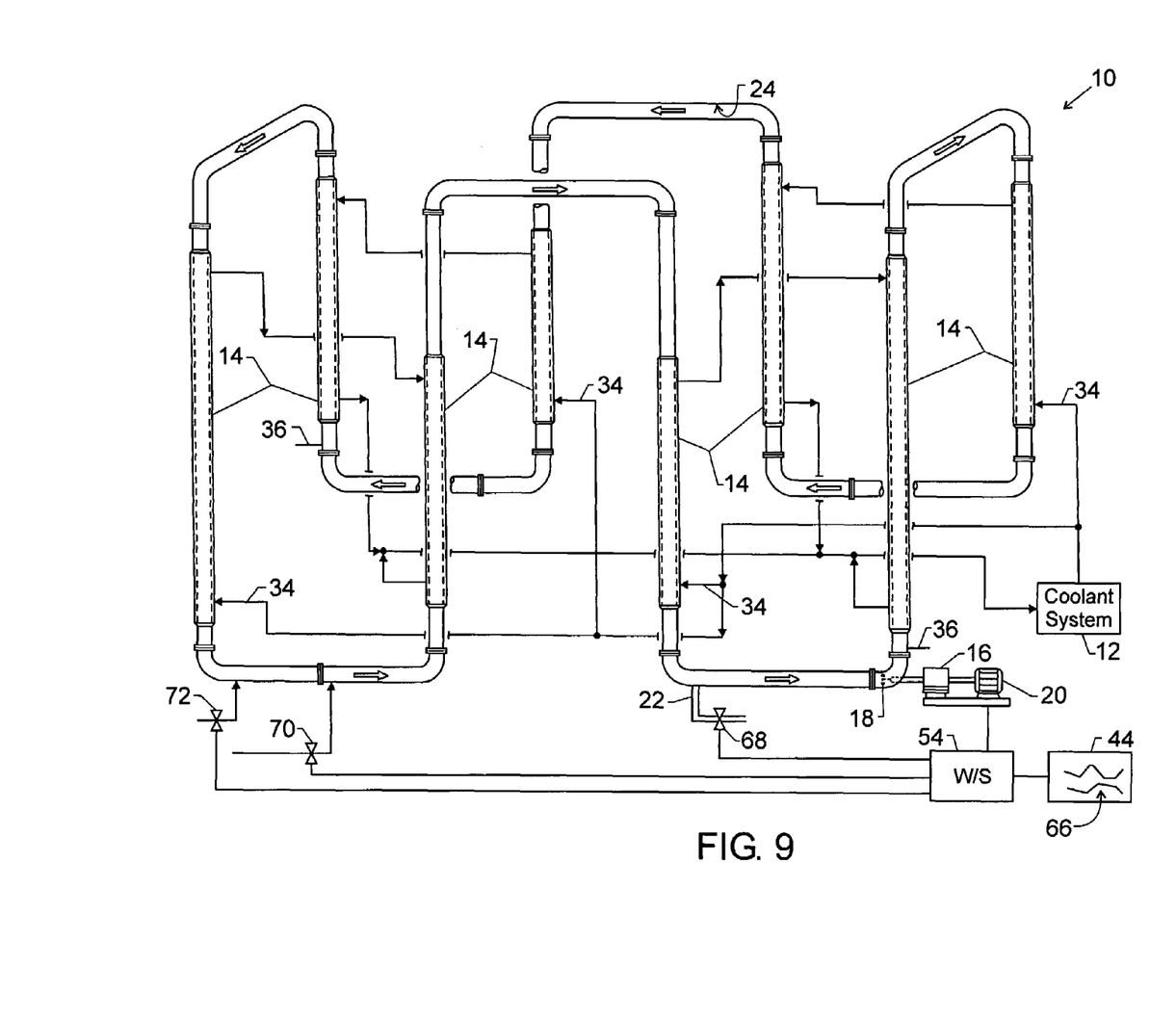
FIG. 9 depicts a loop slurry reactor configured for manual response to a statistically derived predictive indicator of a foul, in accordance with one aspect of the present technique.

Furthermore, as will be appreciated by those of ordinary skill in the art, monitoring, detection, and response to a predictive indicator, such as a crossover event, determined in this manner may be manual or automated. For example, referring now to FIG. 9, a workstation 54 and display 44, as discussed above, are depicted in conjunction with the reactor 10. The workstation may include analysis circuitry or may be configured to execute analysis routines for performing time series analysis, such as a periodogram analysis, on one or more reactor operating conditions, such as pump power, temperature, pressure, and so forth. The result 66 of the analysis may be displayed on a monitor 44 for review by an operator. If, based on the displayed results 66, the operator decides a corrective action is to be taken the operator may adjust the reactor conditions, such as by reducing the solids in the reactor 10 by increasing the flow through a take-off valve 68 or by reducing the flow of catalyst or reactants through an inlet valve 70 of the reactor 10. Similarly, the operator may choose to increase the flow of an additive, such as an anti-static agent, through an additive valve 72 in response to the displayed results 66. While these valve operations may be performed by circuitry or routines accessible to the operator at the workstation 54, the operator may also manually actuate or adjust the valves 68, 70, and 72 in some embodiments.

Figure 10:
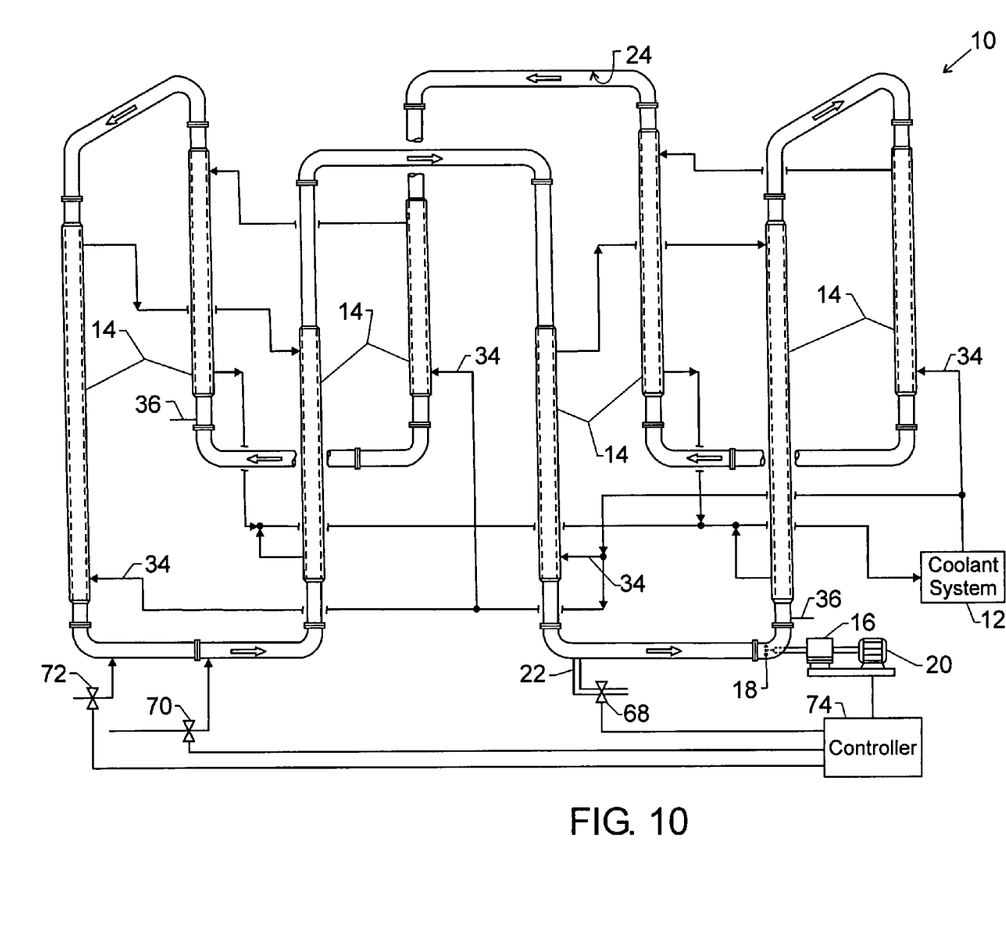
FIG. 10 depicts a loop slurry reactor configured for automatic response to a statistically derived predictive indicator of a foul, in accordance with one aspect of the present technique.

Alternatively, the monitoring, detection, and response scheme may be fully or partly automated. As depicted in FIG. 10, the pump power or other reactor operation data may be provided to a controller 74, such as a suitably configured general or special purpose computer system. The controller 74 may be provided with control circuitry or may execute one or more control routines to analyze and evaluate the results of a time series analysis, such as a periodogram analysis, of the reactor operation data. If a predictive indicator, such as a crossover event, is detected, the controller 74 adjusts the operation of the reactor in accordance with a preconfigured response. For example, if a reactor foul is predicted, the controller 74 may perform operations to reduce reactor solids, such as by increasing the take-off of solids, by reducing the addition of reactants or catalyst, or by increasing the addition of additives, such as anti-static agents, as discussed above. In one embodiment, valve control circuitry or routines, generates signals that adjust the flow solids, reactant, catalyst, and/or additives, as described above.

While advance warning of impending fouls is one use for the results of a periodogram analysis of pump power or other reactor operating conditions, other uses may also exist. For example, the periodogram analysis may also be used to detect the presence of local accumulations or polymer aggregates in the circulating slurry. In particular, an increase in intensity, i.e., amplitude, of the first trace 60 may indicate the presence of such aggregates while a subsequent decrease in intensity may be indicative of the dissolution of the local accumulation or polymer aggregate.

In addition, it has been noted that the frequencies associated with the first and second periodic components in a periodogram analysis of pump power correspond to the reactor circulation rate. This correspondence may provide an alternate and independent method for estimating the reactor circulation rate. An example of this correspondence may be observed in the preceding discussion where the period for the second periodic component was determined to be 45.4 seconds, which generally corresponds to the time in which the reactor contents complete one circuit of the reactor 10. Similarly, the period for the first periodic component was determined to be 22.5 seconds, which generally corresponds to the time taken to complete half of a circuit. At another reactor for which data was collected, the periods of the first and second periodic components were observed to have a similar relationship to circulation, with the first periodic component having a period of 11.5 seconds and the second periodic component having a period of 23.5 seconds.

Furthermore, while the preceeding technique may be useful in predicting reactor fouls in polymerization systems that exhibit the second periodic component, plotted as second trace 62, the technique may also be useful in evaluating catalysts for fouling susceptibility. In particular, it has been observed that when pump power data acquired during reactions using catalysts that are less prone to foul is analyzed by periodogram analysis, the second periodic component, as measured by peak intensity is reduced or absent. For example, it has been observed that chrome type catalysts acquired from different suppliers differ in their fouling propensity, with catalysts that are less prone to fouling exhibiting no second periodic component or a second periodic component having a small amplitude. Based on these observations, the periodogram analysis technique may be used to screen catalysts for fouling susceptibility, such as by determining the presence or scale of a second periodic component in the periodogram analyses of pump power usage for different catalysts.

While the periodogram techniques discussed above represent one example of statistical analysis that may be used to derive predictive indicators of fouling from time series data, other statistical analysis techniques may also be employed. For example, analyses based on spectrum and spectral density functions may be employed to derive predictive indicators from suitable time-series data and may offer advantages if the frequency of the underlying periodic components varies over time. In such embodiments the spectrum is the Fourier cosine transform of the autocovariance function. These statistical techniques, including periodogram analysis, may be implemented in an ongoing monitor and control scheme, such as part of a distributed control system (DCS) for a polymerization reactor. Such an implementation may analyze a "sliding window" of time series data, such as the pump power data acquired over the last hour, to generate a statistical analysis, such as the periodogram analyses discussed herein, which may be evaluated for predictive indicators, such as the crossover event 64. The analysis may be updated at intervals, such as every ten minutes, based on the sample rate for the time series data.

Furthermore, the present techniques may be applied to reactors producing polyethylene, polypropylene, or other polyolefins, all of which may be formed into respective articles for commercial, residential, or industrial use. The present techniques may also be applied to a variety of reactor geometries, such as horizontal, vertical leg, pilot plants, and so forth. As may be expected, different periodograms may be derived for different reactors and/or for different catalyst systems, such that the analysis may differ as well. However, for reactors and/or catalyst systems which exhibit a second periodic component, events such as crossover event 64 are believed to consistently indicate a pending foul. Furthermore, as one of ordinary skill in the art will appreciate, sampling frequency, trace intensity and trace frequency are inter-related so that it may be advisable to periodically re-evaluate assumptions about the plotting of trace points to confirm the calibration of ongoing analyses.

Downstream Processing

While the preceding discussion related to the production of polyolefins, such as polyethylene, in a polymerization reactor 10, one skilled in the art will appreciate that the polyolefins produced in such a reactor 10 are typically further processed. For example, referring now to FIG. 11, the dried polyolefin may be processed to remove unreacted reactants and catalyst in a polyolefin recovery system 80, which may include various subsystems such as monomer recovery columns, flash vessels, and cyclones. The purified polyolefin is typically provided to an extrusion system 82 where the polyolefin product is typically extruded to produce polymer pellets with the desired mechanical, physical, and melt characteristics. Additives, such as UV inhibitors and peroxides, may be added to the polyolefin product prior to or during extrusion to impart desired characteristics to the extruded polymer pellets.

Figure 11:
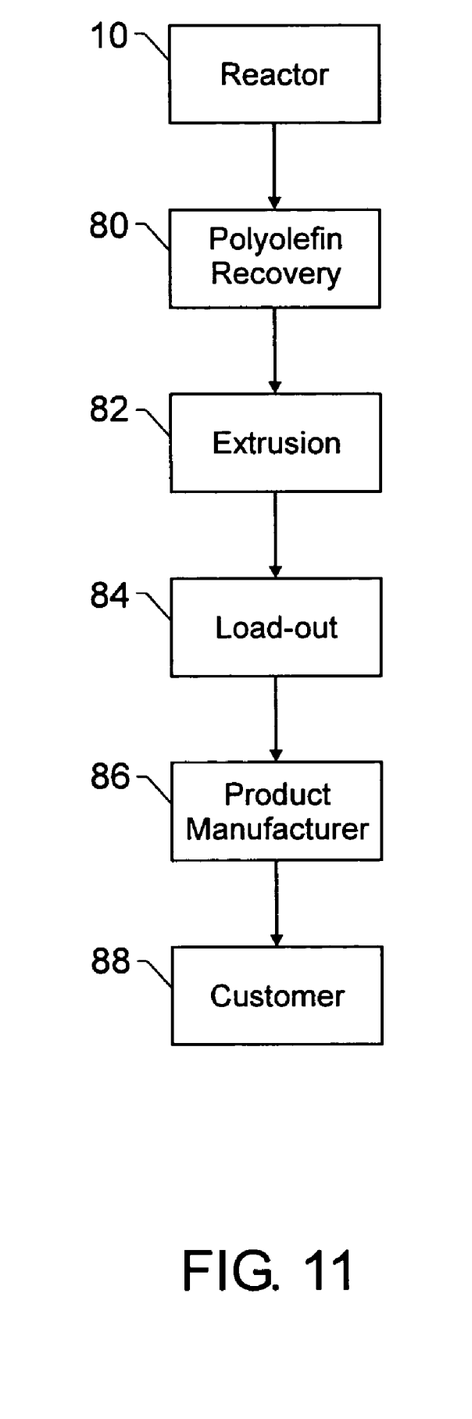
FIG. 11 is a block diagram illustrating steps in the post-processing of polyolefins produced in a polymerization reactor, in accordance with one aspect of the present technique.

The resulting polyolefin pellets may then be transported to a product load-out area 84 where the pellets may be stored, blended with other pellets and/or loaded into railcars, trucks, bags, and so forth, for distribution to product manufacturers 86. In the case of polyethylene, pellets shipped to product manufacturers 86 may include low density polyethylene (LDPE), linear low density polyethylene (LLDPE), medium density polyethylene (MDPE), high density polyethylene (HDPE), and enhanced polyethylene. The various types and grades of polyethylene pellets may be marketed, for example, under the brand names Marlex® polyethylene or MarFlex™ polyethylene of Chevron-Phillips Chemical Company, LP, of The Woodlands, Tex., USA.

The polyolefin (e.g., polyethylene) pellets may be used in the manufacture of a variety of products, components, household items and other items, including adhesives (e.g., hot-melt adhesive applications), electrical wire and cable, agricultural films, shrink film, stretch film, food packaging films, flexible food packaging, milk containers, frozen-food packaging, trash and can liners, grocery bags, heavy-duty sacks, plastic bottles, safety equipment, coatings, toys and a variety of containers and plastic products. Further, it should be emphasized that polyolefins other than polyethylene, such as polypropylene, may form such components and products via the processes discussed below.

In addition, the products and components formed from polyolefin (e.g., polyethylene) pellets may be further processed and assembled by the manufacturer 86 for distribution and sale to a consumer, such as customer 88. For example, a polyethylene milk bottle may be filled with milk for distribution to the consumer, or a polyolefin fuel tank may be assembled into an automobile for distribution and sale to the consumer.

To form end-products or components from the pellets, the pellets are generally subjected to further processing, such as blow molding, injection molding, rotational molding, blown film, cast film, extrusion (e.g., sheet extrusion, pipe and corrugated extrusion, coating/lamination extrusion, etc.), and so on. Blow molding is a process used for producing hollow plastic parts, and may employ blow molding equipment, such as reciprocating screw machines, accumulator head machines, and so on. The blow molding process may be tailored to meet the customer's needs, and to manufacture products ranging from plastic milk bottles to the automotive fuel tanks mentioned above. Similarly, in injection molding, products and components may be molded for a wide range of applications, including containers, food and chemical packaging, toys, automotive, crates, caps and closures, to name a few.

Extrusion processes may also be used. Polyolefin pipe, for example polyethylene pipe, may be extruded from polyethylene pellet resins and used in an assortment of applications due to its chemical resistance, relative ease of installation, durability, cost advantages, and the like. Indeed, plastic polyethylene piping has achieved significant use for water mains, gas distribution, storm and sanitary sewers, interior plumbing, electrical conduits, power and communications ducts, chilled water piping, well casing, to name a few applications. Further, high-density polyethylene (HDPE), which generally constitutes the largest volume of the polyolefin group of plastics used for pipe, is tough, abrasion-resistant and flexible (even at subfreezing temperatures). Furthermore, HDPE pipe may be used in small diameter tubing and in pipe up to more than 8 feet in diameter. In general, polyethylene pellets (resins) may be supplied for the pressure piping markets, such as in natural gas distribution, and for the non-pressure piping markets, such as for conduit and corrugated piping.

Rotational molding is a high-temperature, low-pressure process used to form hollow parts through the application of heat to biaxially-rotated molds. Polyethylene pellet resins generally applicable in this process are those resins that flow together in the absence of pressure when melted to form a bubble-free part. Pellets, such as certain Marlex® HDPE and MDPE resins, offer such flow characteristics and a wide processing window. Furthermore, these polyethylene resins suitable for rotational molding may exhibit desirable low-temperature impact strength, good load-bearing properties, and good ultraviolet (UV) stability. Accordingly, applications for rotationally-molded Marlex® resins include agricultural tanks, industrial chemical tanks, potable water storage tanks, industrial waste containers, recreational equipment, marine products, plus many more.

Sheet extrusion is a technique for making flat plastic sheets from a variety of pellet 38 resins. The relatively thinner gauge sheets are generally thermoformed into packaging applications such as drink cups, deli containers, produce trays, baby wipe containers and margarine tubs. Other markets for sheet extrusion of polyolefin include those that utilize relatively thicker sheets for industrial and recreational applications, such as truck bed liners, pallets, automotive dunnage, playground equipment, and boats. A third use for extruded sheet, for example, is in geomembranes, where flat-sheet polyethylene material is welded into large containment systems for mining applications and municipal waste disposal.

The blown film process is a relatively diverse conversion system used for polyethylene. The American Society for Testing and Materials (ASTM) defines films as less than 0.254 millimeter (10 mils) in thickness. However, the blown film process can produce materials as thick as 0.5 millimeter (20 mils), and higher. Furthermore, blow molding in conjunction with monolayer and/or multilayer coextrusion technologies lay the groundwork for several applications. Advantageous properties of the blow molding products may include clarity, strength, tearability, optical properties, and toughness, to name a few. Applications may include food and retail packaging, industrial packaging, and non-packaging applications, such as agricultural films, hygiene film, and so forth.

The cast film process may differ from the blown film process through the fast quench and virtual unidirectional orientation capabilities. These characteristics allow a cast film line, for example, to operate at higher production rates while producing beneficial optics. Applications in food and retail packaging take advantage of these strengths. Finally, polyolefin pellets may also be supplied for the extrusion coating and lamination industry.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method comprising:
   acquiring a first set of reactor operations data of a liquid-phase polymerization reactor for a first period of reactor operation utilizing a first catalyst;
   acquiring a second set of reactor operations data of the liquid-phase polymerization reactor for a second period of reactor operation utilizing a second catalyst;
   performing a periodogram analysis of each of the first and the second sets of reactor operations data;
   evaluating plots of the respective periodogram analyses to detect first and second periodic components within each of the respective periodogram analyses and to determine which of the respective periodogram analyses has a more reduced or absent second periodic component;
   selecting one of the first catalyst and the second catalyst based on the evaluation, such that the selected catalyst corresponds to the periodogram analysis with the more reduced or absent second periodic component; and
   operating the liquid-phase polymerization reactor with the selected catalyst.

2. A method for operating a polymerization reactor, comprising:
- circulating a monomer and a catalyst in a loop reactor;
- polymerizing the monomer on the catalyst to form a plurality of polymer particles in the loop reactor;
- analyzing a set of reactor operations data acquired over time during polymerization of the monomer to identify periodic components within the reactor operations data;
- evaluating the periodic components to detect one or more predictive indicators within the periodic components, wherein the predictive indicators are indicative of a reactor foul in the loop reactor and wherein the predictive indicators comprise one or more cross over events, divergences, inflection points, maximums, minimums, or combinations thereof; and
- adjusting one or more reactor conditions of the loop reactor in response to detection of the one or more predictive indicators.

3. The method as recited in claim 2, wherein adjusting one or more reactor conditions comprises lowering reactor solids.

4. The method as recited in claim 3, wherein lowering reactor solids comprises at least one of increasing a take-off rate of the polymer particles, decreasing the addition rate of the monomer, or decreasing the addition rate of the catalyst.

5. The method as recited in claim 2, wherein adjusting one or more reactor conditions comprises adding an anti-static agent to the loop reactor.

6. The method as recited in claim 2, wherein the one or more predictive indicators provides more than three hours notice of the reactor foul.

7. The method as recited in claim 2, wherein analyzing the set of reactor operations data acquired over time comprises performing a periodogram analysis on the power consumption of a pump circulating the monomer and catalyst.

8. The method as recited in claim 2, wherein analyzing the set of reactor operations data comprises performing a time series analysis of the set of reactor operations data.

9. The method as recited in claim 2, wherein analyzing the set of reactor operations data comprises performing a periodogram analysis of the set of reactor operations data.

10. A process for manufacturing a product comprising a polyolefin, the process comprising:
- manufacturing a product at least a portion of which comprises a polyolefin, wherein the polyolefin is produced by a method comprising:
  - polymerizing a monomer in the presence of a catalyst in a liquid-phase polymerization reactor to form a plurality of polymer particles;
  - analyzing a set of reactor operations data acquired over time during polymerization of the monomer to identify periodic components within the reactor operations data, wherein analyzing the set of reactor operations data comprises performing a periodogram analysis of the set of reactor operations data to identify the periodic components;
  - evaluating the periodic components to detect one or more predictive indicators within the periodic components, wherein the predictive indicators are indicative of a reactor foul in the loop reactor and wherein the predictive indicators comprise one or more cross over events, divergences, inflection points, maximums, minimums, or combinations thereof; and
  - adjusting one or more reactor conditions of the loop reactor in response to detection of the one or more predictive indicators.

11. The process as recited in claim 10, wherein the act of manufacturing comprises molding the polyolefin into a polyolefin component of the product.

12. The process as recited in claim 10, wherein the act of manufacturing comprises molding the polyolefin into the product.

13. The process as recited in claim 10, wherein adjusting one or more reactor conditions comprises lowering reactor solids.

14. The process as recited in claim 10, wherein adjusting one or more reactor conditions comprises adding an anti-static agent to the reactor.

15. The process as recited in claim 10, comprising the acts of:
- obtaining the polyolefin; and
- processing the polyolefin.

16. The process as recited in claim 15, wherein the act of processing comprises at least one of the acts of blending, heating, melting, compounding, extruding, injection molding, precision molding, blow-molding, forming a film, and forming a coating.

17. The process as recited in claim 15, wherein the act of processing comprises the act of incorporating an additive into the polyolefin.

18. The process as recited in claim 10, comprising the act of shipping the product.

19. The method of claim 1, wherein acquiring a first set of reactor operations data and acquiring a second set of reactor operations data comprises measuring pump power usage, reactor density, reactor pressure, or combinations thereof.

20. The method of claim 1, wherein evaluating plots of the respective periodogram analyses comprises executing one or more control routines with control circuitry.

\* \* \* \* \*

UNITED STATES PATENT AND TRADEMARK OFFICE
CERTIFICATE OF CORRECTION

PATENT NO. : 7,645,841 B2 Page 1 of 1
APPLICATION NO. : 10/928047
DATED : January 12, 2010
INVENTOR(S) : Shaw et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 383 days.

Signed and Sealed this

Sixteenth Day of November, 2010

David J. Kappos
*Director of the United States Patent and Trademark Office*